(12) United States Patent
Luisman et al.

(10) Patent No.: US 10,646,815 B2
(45) Date of Patent: May 12, 2020

(54) SYSTEM AND PROCESS FOR CARBON DIOXIDE REMOVAL OF AIR OF PASSENGER CABINS OF VEHICLES

(71) Applicant: Johnson Matthey Public Limited Company, London (GB)

(72) Inventors: Luke Alan Luisman, Reading (GB); Alvaro Amieiro-Fonseca, Reading (GB); Yolanda Van Lishout, Reading (GB); Graham Reed, London (GB)

(73) Assignee: Johnson Matthey Public Limited Company, London (GB)

( * ) Notice: Subject to any disclaimer, the term of this patent is extended or adjusted under 35 U.S.C. 154(b) by 75 days.

(21) Appl. No.: 15/510,780

(22) PCT Filed: Sep. 3, 2015

(86) PCT No.: PCT/GB2015/052541
§ 371 (c)(1),
(2) Date: Mar. 13, 2017

(87) PCT Pub. No.: WO2016/038340
PCT Pub. Date: Mar. 17, 2016

(65) Prior Publication Data
US 2017/0239609 A1 Aug. 24, 2017

(30) Foreign Application Priority Data

Sep. 12, 2014 (GB) .................................... 1416155.8
Sep. 17, 2014 (GB) .................................... 1416400.8

(51) Int. Cl.
*B01D 53/02* (2006.01)
*B01D 53/04* (2006.01)
(Continued)

(52) U.S. Cl.
CPC ......... *B01D 53/0423* (2013.01); *B01D 53/04* (2013.01); *B01J 20/103* (2013.01);
(Continued)

(58) Field of Classification Search
CPC ........ B01D 2253/106; B01D 2253/108; B01D 2253/11; B01D 2253/202;
(Continued)

(56) References Cited

U.S. PATENT DOCUMENTS

2001/0004895 A1* 6/2001 Preiss ................... A61M 16/22
128/205.28
2005/0217487 A1 10/2005 Fielding
(Continued)

FOREIGN PATENT DOCUMENTS

CN 103648612 A 3/2014
DE 19830470 C1 11/1999
(Continued)

OTHER PUBLICATIONS

Pui, David Y.H., et al., "Recirculating Air Filtration Significantly Reduces Exposure to Airborne Nanoparticles," Environmental Health Perspectives 2008 (116) 7; pp. 863-866.
(Continued)

*Primary Examiner* — Christopher P Jones
(74) *Attorney, Agent, or Firm* — BakerHostetler

(57) ABSTRACT

The present invention relates to systems and methods for controlling the atmosphere in the cabin (1) of a vehicle. The system comprises a carbon dioxide removal conduit (2) comprising a regenerable carbon dioxide removal chamber (5,6) containing a carbon dioxide sorbent material and a regeneration circuit (7) arranged to expel the desorbed carbon dioxide at a location exterior (8) of the cabin (1) The system is operable to maintain a carbon dioxide level below 1000 ppm in the passenger cabin for a period of at least 5

(Continued)

minutes while restricting the flow of air from outside the vehicle into the passenger cabin to 10 L/s or less.

15 Claims, 9 Drawing Sheets

(51) Int. Cl.
| | |
|---|---|
| *B01J 20/32* | (2006.01) |
| *B60H 3/06* | (2006.01) |
| *B01J 20/26* | (2006.01) |
| *B01J 20/10* | (2006.01) |
| *B01J 20/28* | (2006.01) |
| *B01J 20/22* | (2006.01) |
| *B01J 20/34* | (2006.01) |

(52) U.S. Cl.
CPC .............. *B01J 20/22* (2013.01); *B01J 20/265* (2013.01); *B01J 20/28042* (2013.01); *B01J 20/3242* (2013.01); *B01J 20/3244* (2013.01); *B01J 20/3425* (2013.01); *B01J 20/3483* (2013.01); *B60H 3/06* (2013.01); *B60H 3/0633* (2013.01); *B01D 2253/106* (2013.01); *B01D 2253/108* (2013.01); *B01D 2253/11* (2013.01); *B01D 2253/202* (2013.01); *B01D 2253/204* (2013.01); *B01D 2253/25* (2013.01); *B01D 2257/504* (2013.01); *B01D 2257/708* (2013.01); *B01D 2258/06* (2013.01); *B01D 2259/401* (2013.01); *B01D 2259/402* (2013.01); *B01D 2259/4009* (2013.01); *B01D 2259/40086* (2013.01); *B01D 2259/414* (2013.01); *B01D 2259/4566* (2013.01); *B60H 2003/0691* (2013.01); *Y02C 10/08* (2013.01)

(58) Field of Classification Search
CPC .......... B01D 2253/204; B01D 2253/25; B01D 2257/504; B01D 2257/708; B01D 2258/06; B01D 2259/40086; B01D 2259/4009; B01D 2259/401; B01D 2259/402; B01D 2259/414; B01D 2259/4566; B01D 53/04; B01D 53/0423; B01J 20/22; B01J 20/265; B01J 20/28042; B01J 20/3242; B01J 20/3244; B01J 20/3425; B01J 20/3483; B60H 2003/0691; B60H 3/06; B60H 3/0633; Y02C 10/08

See application file for complete search history.

(56) References Cited

U.S. PATENT DOCUMENTS

| | | | |
|---|---|---|---|
| 2006/0144061 | A1 | 7/2006 | Badenhorst et al. |
| 2010/0292072 | A1* | 11/2010 | Gray ................ B01J 20/26 502/56 |
| 2011/0088550 | A1* | 4/2011 | Tirio .................. B01D 53/02 95/96 |
| 2011/0179948 | A1 | 7/2011 | Choi et al. |
| 2014/0112856 | A1* | 4/2014 | Krutka ............. B01D 53/0462 423/228 |
| 2014/0202330 | A1 | 7/2014 | Meirav et al. |

FOREIGN PATENT DOCUMENTS

| | | |
|---|---|---|
| EP | 1101641 A2 | 5/2001 |
| JP | 04135611 A | 5/1992 |
| JP | 2010173454 A | 8/2010 |
| JP | 2014507275 A | 3/2014 |
| JP | 2014522298 A | 9/2014 |
| WO | 2004101113 A1 | 11/2004 |
| WO | 2011049759 A1 | 4/2011 |
| WO | 2012109358 A2 | 8/2012 |
| WO | 2012158911 A2 | 11/2012 |
| WO | 2014078708 A1 | 5/2014 |

OTHER PUBLICATIONS

Grady, Michael L., et al., "Vehicle Cabin Air Quality with Fractional Air Recirculation," SAE International, DOI 10.4271 / 2013-01-1494.

Henning, K.-D., et al., "Impregnated Activated Carbon for environmental Protection," Gas Separation & Purification, 1993 (7) 4, pp. 235-240.

Jung, Heejung, "Modeling CO2 Concentrations in Vehicle Cabin," SAE International, DOI 10.4271 /2013-01-1497.

Farrington, R., et al., "Impact of Vehicle Air-Conditioning on Fuel Economy, Tailpipe Emissions, and Electric Vehicle Range," National Renewable Energy Laboratory Conference Paper Sep. 2000, Earth Technologies Forum, Washington, DC, Oct. 31, 2000.

\* cited by examiner

SYSTEM AND PROCESS FOR CARBON DIOXIDE REMOVAL OF AIR OF PASSENGER CABINS OF VEHICLES

FIELD OF THE INVENTION

The present invention relates to systems and methods for controlling the atmosphere in the cabin of a vehicle.

BACKGROUND OF THE INVENTION

Heating, ventilation and air conditioning (HVAC) systems can be a significant contributor to the energy requirements of a vehicle. The high energy demand of the compressor in these systems can lead to a reduction of 8% to 12% in the mileage range of an internal combustion engine (ICE) vehicle, due to the impact on fuel economy. In an electric vehicle (EV), the HVAC system can lead to a reduction of 40% in the mileage range. Accordingly, reducing the energy load of HVAC systems is of considerable interest, as this has the potential to provide benefits associated with improved energy efficiency and fuel economy. Increasing the range of electric vehicles is also desirable.

Reference 1 discusses the impact of vehicle air conditioning on fuel economy, tailpipe emissions and electric vehicle range. In order to reduce air conditioning load, this document proposes a number of options, including advanced glazing to reduce the effect of solar energy on heating a vehicle cabin, and using recirculated air in the HVAC system. Operating an HVAC system in recirculation mode, where air from the cabin is passed through the HVAC system and returned to the cabin, can considerably reduce the energy load of the HVAC system. This reduces the amount of air brought in from outside the vehicle for ventilation, which reduces the load on the HVAC system since the recirculated cabin air is typically closer to the desired temperature than air from outside the cabin. Reference 1 highlights that there are disadvantages associated with operating the HVAC system in recirculation mode, discussing in particular that a build-up of volatile organic compounds (VOCs) is observed when HVAC systems are operated in recirculation mode (especially in newer cars). Reference 1 proposes using 70% recirculated air for vehicle heating, and 80% recirculated air for vehicle cooling.

A further advantage of operating the HVAC system of a vehicle in recirculation mode is that this can reduce the concentration of particulate pollutants in the cabin, as discussed in References 2 and 3. As Reference 2 explains, airborne nanoparticles from vehicle emissions pose health risks, particularly when driving in heavy traffic. This document reports that the concentration of nanoparticles is rapidly significantly reduced in two commercially available vehicles when their HVAC systems are operated in recirculation mode while driving in heavy traffic. This effect is also discussed in Reference 3.

However, Reference 3 highlights a significant problem associated with the operation of HVAC systems in recirculation mode. In recirculation mode, carbon dioxide levels inside the cabin rise very rapidly, primarily due to exhalation of carbon dioxide by the vehicle's occupants. Reference 3 is concerned with modelling the carbon dioxide concentration in vehicle cabins. This document discusses two possible approaches for supressing the increase of cabin carbon dioxide concentration observed when recirculation mode is employed. The first is automatic air recirculation, which relies on a fast-responding gas sensor to detect high levels of pollutants on roadways. On detection of high pollution levels, air intake is temporarily shut off and cabin air recirculated. A similar system is described in US2005/0217487, where air recirculation and contaminant removal is triggered in response to contaminants detected by a sensor, e.g. in a building or an agricultural vehicle. This document proposes removing carbon dioxide from the cabin when recirculation has been activated, using an assembly for adsorbing carbon dioxide.

The second approach proposed in Reference 3 is fractional continuous recirculation, where some external air intake is permitted to suppress the increase in carbon dioxide concentrations. Reference 4 reports measurements of particulate concentration and carbon dioxide levels under fractional air recirculation conditions.

US2006/0144061 proposes a climate control system which, in its normal operation mode is operated in recirculation mode. Upon exceeding a pre-determined carbon dioxide threshold value measured in the passenger compartment of the motor vehicle the climate control system is switched to fresh air mode.

SUMMARY OF THE INVENTION

There remains a need for improved ventilation systems for vehicles. In particular, there remains a need for systems which enable a reduction in the energy load associated with operation of HVAC systems, since this may, for example, improve fuel economy and/or increase vehicle range. There also remains a need for systems which provide improved air quality within the cabin, as this can enhance the comfort and/or health of the passengers.

An important consideration is maintaining a safe carbon dioxide level inside the vehicle cabin, of 1500 ppm or less and more preferably 1000 ppm or less.

The present inventors have found that it is possible to operate the ventilation system of a vehicle in full recirculation mode without the need for external ventilation while avoiding the build-up of carbon dioxide by employing a carbon dioxide sorbent material to remove excess carbon dioxide. The carbon dioxide sorbent material is regenerable, in order to provide ongoing sorption of carbon dioxide with prolonged use of the system (i.e. multiple sorption and desorption cycles). This means that the normal operation mode of the ventilation system can be recirculation, e.g. over the lifetime of the vehicle.

As the skilled person will understand, regeneration requires energy input. However, as demonstrated in the Examples section, the present inventors have found that inclusion of a regenerable carbon dioxide adsorption assembly in a system for controlling the atmosphere in the passenger cabin of a vehicle in many cases provides an energy benefit.

Accordingly, in a first preferred aspect the present invention provides a system for controlling the atmosphere in the passenger cabin of a vehicle, the system comprising;
  a carbon dioxide removal assembly, comprising
    regenerable carbon dioxide sorbent material;
    a carbon dioxide removal conduit arranged to flow air from the interior of the passenger cabin over the regenerable carbon dioxide sorbent material and return the treated air to the passenger cabin; and
    a regeneration conduit arranged to flow desorption gas over the regenerable carbon dioxide sorbent material to desorb carbon dioxide from the sorbent material and expel the desorbed carbon dioxide at a location exterior to the cabin;

whereby the system is operable to maintain a carbon dioxide level below 1500 ppm in the passenger cabin for a period of at least 5 minutes while restricting the flow of air from outside the vehicle into the passenger cabin to 10 L/s or less.

In a second preferred aspect the present invention provides use of a system for controlling the atmosphere in the passenger cabin of a vehicle to maintain a carbon dioxide level below 1500 ppm in the passenger cabin for a period of at least 5 minutes while restricting the flow of air from outside the vehicle into the passenger cabin to 10 L/s or less, wherein the system comprises:
- a carbon dioxide removal assembly, comprising
  - regenerable carbon dioxide sorbent material;
    - a carbon dioxide removal conduit arranged to flow air from the interior of the passenger cabin over the regenerable carbon dioxide sorbent material and return the treated air to the passenger cabin; and
    - a regeneration conduit arranged to flow desorption gas over the regenerable carbon dioxide sorbent material to desorb carbon dioxide from the sorbent material and expel the desorbed carbon dioxide at a location exterior to the cabin.

In a third preferred aspect the present invention provides a process for controlling the atmosphere in the passenger cabin of a vehicle, the process comprising:
  (i) flowing a portion of the air from within the passenger cabin over regenerable carbon dioxide sorbent material to remove carbon dioxide and returning the treated air to the passenger cabin; and
  (ii) regenerating the regenerable carbon dioxide sorbent material by flowing desorption gas over the regenerable carbon dioxide sorbent material to desorb carbon dioxide from the sorbent material and expelling the desorbed carbon dioxide at a location exterior to the passenger cabin,
wherein steps (i) and (ii) are repeated to maintain the carbon dioxide level below 1500 ppm in the passenger cabin for a period of at least 5 minutes while restricting the flow of air from outside the vehicle into the passenger cabin to 10 L/s or less.

The ability to operate the ventilation system on full recirculation mode provides an additional advantage, as the prospects for purifying the air within the cabin to remove pollutants are greatly enhanced. Rather than treating large volumes of air which would be taken into the cabin when a ventilation system is operated without recirculation, or even in partial recirculation mode, only the air within the cabin needs to be treated. This results in improved filter lifetimes and reduces the frequency of regeneration required in the case of sorbent or catalytic removal technologies. Accordingly, the lifetime of a contaminant removal assembly can be increased, and the energy load associated with regeneration of the contaminant removal assembly can be reduced.

Accordingly, the system may further comprise a contaminant removal assembly, comprising one or more contaminant removal materials, wherein the system is operable to flow air over and/or through the contaminant removal material(s) to remove contaminants and supply the treated air to the interior of the passenger cabin. The process may comprise flowing air over and/or through one or more contaminant removal materials to remove contaminants and supplying the treated air to the interior of the passenger cabin.

In a further preferred aspect the present invention provides a vehicle comprising a system for controlling the atmosphere in its passenger cabin, the system being as defined herein.

DETAILED DESCRIPTION

Figure 1:
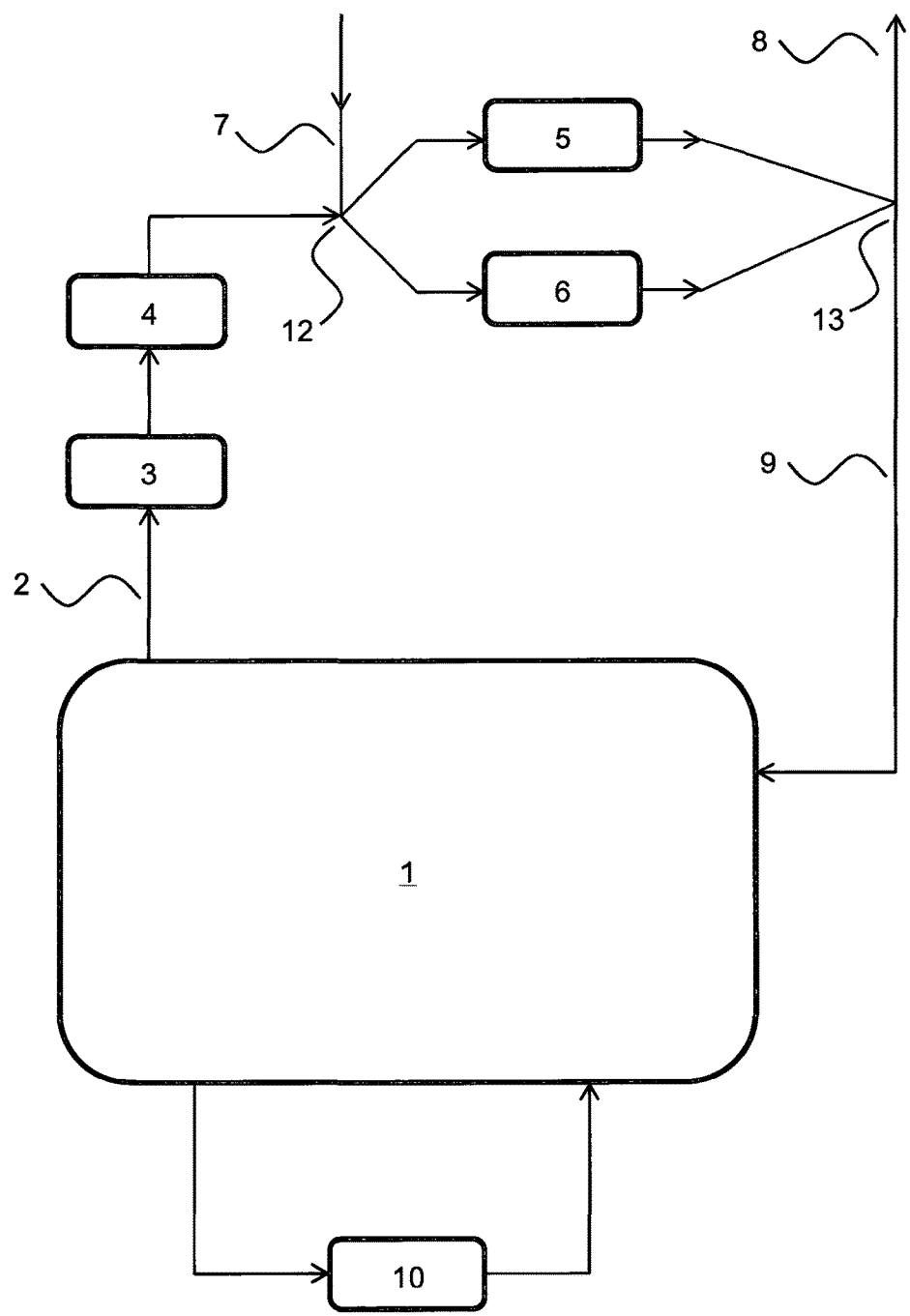
FIG. 1 illustrates a system for controlling the atmosphere in the passenger cabin of a vehicle according to a preferred embodiment of the present invention.

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

Carbon Dioxide Removal Assembly

Regenerable carbon dioxide sorbent material is employed in the methods of the present invention. A range of regenerable carbon dioxide sorbent materials are known. Typically, regenerable carbon dioxide sorbent materials are regenerated by heating them to promote desorption of the sorbed carbon dioxide and flowing a desorption gas over the material to carry away the desorbed carbon dioxide. Additionally, the sorbent material may be exposed to a pressure below atmospheric pressure to encourage desorption. This can result in a lowering of the temperature required to effect desorption.

A regenerable carbon dioxide sorbent material is generally capable of sorbing carbon dioxide at temperatures within a sorption temperature range. The regenerable carbon dioxide sorbent materials useful in the present invention are typically capable of sorbing carbon dioxide at temperatures of 60° C. or less, 50° C. or less, 40° C. or less, or 30° C. or less. The regenerable carbon dioxide sorbent materials useful in the present invention are typically capable of adsorbing carbon dioxide at temperatures of at least −20° C., at least −10° C., at least 0° C., at least 5° C. or at least 10° C. A particularly suitable range is from −10° C. to 40° C. Carbon dioxide may also be sorbed at temperatures outside the ranges specified above, but it may be preferable that the regenerable carbon dioxide sorption material is capable of sorbing carbon dioxide at least within the temperature ranges specified. It is not necessary that the regenerable carbon dioxide sorption material is capable of sorbing carbon dioxide across the entirety of a specified range (although this may be desirable), merely that it is capable of sorbing carbon dioxide at at least one temperature within that range. Typically, the sorption temperature is determined at atmospheric pressure. However, it may be determined at the pressure the carbon dioxide sorption material is exposed to during sorption under the standard operation conditions of the process or system.

In the use and process of the present invention, sorption of carbon dioxide by the sorbent material is typically carried out at a temperature within the range of sorption temperatures specified above.

Desorption of carbon dioxide (regeneration) typically occurs above a certain temperature (the regeneration temperature). The regeneration temperature of the regenerable carbon dioxide sorbent materials useful in the present invention may for example be at least 50° C. or at least 60° C. The regeneration temperature of the regenerable carbon dioxide sorbent materials useful in the present invention may for example be 200° C. or less, 170° C. or less, 150° C. or less, 130° C. or less, 120° C. or less, 110° C. or less, 100° c or less, 90° C. or less or 80° C. or less. Particularly suitable are regenerable carbon dioxide sorbent materials having a regeneration temperature in the range from 50° C. to 120° C., as such materials are readily regenerated at temperatures slightly above the ambient temperatures at which sorption typically occurs, thus minimising the energy requirements associated with heating the sorption material to regenerate it. Typically, the regeneration temperature is determined at atmospheric pressure. However, it may be determined at the pressure the carbon dioxide sorption material is exposed to during regeneration under the standard operation conditions of the process or system.

In the use and in the process of the present invention, regeneration of the regenerable carbon dioxide sorbent material is typically carried out at a temperature above the regeneration temperature of the material employed, which may be a regeneration temperature specified above.

Where sorption and regeneration temperatures are specified herein, they refer to the temperature of the sorbent material at its surface during sorption or regeneration respectively. Depending on the heat transfer properties of the sorbent material, this temperature may be different from the temperature of the surroundings of the sorption material.

The regenerable carbon dioxide sorption material typically has a carbon dioxide capacity of at least 0.5 wt %, at least 1 wt % at least 2 wt %, at least 25 wt %, at least 3 wt %, at least 4 wt % or at least 5 wt %. There is no particular upper limit on the capacity of the regenerable carbon dioxide sorption material, although typically regenerable carbon dioxide sorption materials have a capacity of 25 wt % or less, 15 wt % or less, 10 wt % or less, 8 wt % or less, or 7 wt % or less. (A carbon dioxide capacity of x wt % means that a maximum of x g of carbon dioxide is sorbed per 100 g of sorption material.)

The skilled person is aware of regenerable carbon dioxide sorption materials having suitable sorption and regeneration temperatures and suitable carbon dioxide capacity.

A particularly suitable class of sorbent materials are amine-based sorption materials. Such materials include a moiety comprising an amine functional group. The moieties are typically immobilised (e.g. covalently) on a solid support. Preferably, the amine is a primary amine or a secondary amine, more preferably a primary amine. For example, the sorbent may comprise a benzyl amine functional group. For example, the sorbent may comprise an alkyl amine functional group, such as a 3-aminopropyl functional group.

Suitable amine-based sorption materials include a moiety according to Formula I below:

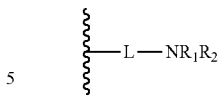

Formula I in which L is a linker group and $R_1$ and $R_2$ are each independently H or optionally substituted $C_1$-$C_{10}$ (e.g. $C_1$-$C_5$ or $C_1$-$C_3$) hydrocarbon group, e.g. an alkyl or alkenyl group. Preferably, at least one of $R_1$ and $R_2$ is H. More preferably, both $R_1$ and $R_2$ are H. As the skilled person will understand, the wobbly line indicates attachment of the linker group to the solid support. The structure of the linker group is not particularly limited in the present invention. The linker group may be, for example, a $C_1$ to $C_{15}$ hydrocarbon moiety, optionally including one or more ether or thioether groups. The term hydrocarbon moiety is intended to include saturated or unsaturated, straight or branched optionally substituted hydrocarbon chains, optionally including one or more optionally substituted cyclic hydrocarbon groups, such as cycloalkylene, cycloalkenylene and arylene groups, including groups where one or more ring carbon atoms are replaced by a heteroatom, such as a heteroatom selected from O, N and S. As the skilled person will readily understand, the linker group is a divalent group attached both to the solid support and to the amine functional group.

For example, the linker group may be selected from:

—$R_3$—, wherein $R_3$ is $C_1$ to $C_{15}$ (e.g. $C_1$ to $C_{10}$ or $C_1$ to $C_5$) straight or branched, optionally substituted alkylene or alkenylene moiety;

—$R_4$—X—$R_4$—, wherein each $R_4$ is independently $C_1$ to $C_{10}$ (e.g. $C_1$ to $C_5$) straight or branched, optionally substituted alkylene or alkenylene moiety and wherein X is selected from O and S; and —$R_5$—Y—$R_5$—, wherein each $R_5$ is independently present or absent and when present is independently selected from $C_1$ to $C_{10}$ (e.g. $C_1$ to $C_5$) straight or branched, optionally substituted alkylene or alkenylene moiety, and —$R_6$—X—$R_6$— wherein each $R_6$ is independently $C_1$ to $C_5$ (e.g. $C_1$ to $C_3$) straight or branched, optionally substituted alkylene or alkenylene moiety, wherein Y is selected from cycloalkylene, cycoalkenylene, arylene, in which one or more ring carbon atoms are replaced by a heteroatom selected from O, N and S, and wherein X is selected from O and S. It may be preferred that each $R_5$ is independently present or absent and when present is independently selected from $C_1$ to $C_{10}$ (e.g. $C_1$ to $C_5$) straight or branched, optionally substituted alkylene or alkenylene moiety.

It may be preferred that $R_3$ is $C_1$ to $C_5$ branched or unbranched, optionally substituted alkylene or alkenylene moiety. It may be preferred that Y is selected from $C_4$ to $C_6$ cycloalkylene and $C_6$ arylene. It may be preferred that X is O. It may be preferred that the linker group is selected from —$R_3$— and —$R_5$—Y—$R_5$—.

As used herein, the term optionally substituted includes moieties in which a one, two, three, four or more hydrogen atoms have been replaced with other functional groups. Suitable functional groups include—halogen, —OH, —SH, —O$R_7$, —S$R_7$, —N$R_7R_7$, C(O)CO$R_7$, —OC(O)$R_7$, —N$R_7$C(O)$R_7$ and C(O)N$R_7R_7$, wherein each $R_7$ is independently H or $C_1$ to $C_{10}$ (e.g. $C_1$-$C_5$ or $C_1$-$C_3$) alkyl or alkenyl, preferably alkyl. For example, suitable substituent functional groups include —OH, —O$R_7$, —N$R_7R_7$, C(O)CO$R_7$, —OC(O)$R_7$, —N$R_7$C(O)$R_7$ and C(O)N$R_7R_7$, wherein each $R_7$ is independently H or $C_1$ to $C_{10}$ (e.g. $C_1$-$C_5$ or $C_1$-$C_3$) alkyl or alkenyl, preferably alkyl.

Particularly suitable amine-based sorption materials include the a moiety according to Formula II or Formula III below:

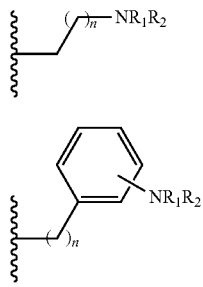

Formula II

Formula III in which $R_1$ and $R_2$ are as defined above, and n is from 0 to 10, more preferably from 0 to 5 or 0 to 3, or from 1 to 5 or from 1 to 3. As the skilled person will understand, the wobbly line indicates the attachment point to the solid support.

The nature of the solid support is not particularly limited. The solid support may be a polymeric solid support. The amine functional group-containing moiety may be covalently attached to the polymer backbone of the polymer of a polymeric solid support. Suitable polymeric supports include polyolefin solid supports, polyvinyl solid supports, and silica solid supports. It may be preferable that the solid support is porous.

Suitable polyolefin solid supports include polyethylene and polypropylene. A particularly suitable polyvinyl polymer is polystyrene. Poly(vinyltoluene), poly(ethylstyrene), poly(alpha-methyl styrene), poly(chlorostyrene) and poly(chloromethylstyrene) may also be suitable. The polymer of the polymeric solid support may be cross-linked, for example using cross linkers such as divinyl aliphatic or aromatic compounds. Silica solid supports, including porous silica solid supports are also suitable.

The present inventors have found that polystyrene benzyl amine is typically capable of sorbing carbon dioxide over a range of temperatures which spans 20° C. Desorption occurs at temperatures of about 60° C. or more. It has a carbon dioxide capacity of about 6 wt %. It can be obtained from Alfa Aesar (UK) under the brand name Quadrapure BZA).

3-aminopropyl silica is typically capable of sorbing carbon dioxide over a range of temperatures which spans 20° C. Desorption occurs at temperatures of about 100° C. or more. It has a carbon dioxide capacity of about 3 wt %. It can be obtained from Alfa Aesar (UK).

Other amine-based sorption materials have similar properties and are suitable for use in the present invention.

Numerous other sorbents are also suitable for use as regenerable carbon dioxide sorbents in the present invention. For example, zeolites or MOFs (metal-organic frameworks) may be used.

The regenerable carbon dioxide material is typically provided as a bed of sorbent material. The nature of the bed is not particularly limited in the present invention. For example, it may be a monolith having sorbent material coated thereon. Alternatively, the sorbent material may be provided as pellets or beads.

Preferably, the sorbent material is arranged to provide a pressure drop of 150 mbar or less, more preferably 100 mbar or less, 70 mbar or lass or 50 mbar or less. There is no preferred lower limit on pressure drop, but typically it will be at least 1 mbar or at least 5 mbar. Reducing the pressure drop reduces the energy required to circulate air through the carbon dioxide removal assembly and accordingly reduces the energy load associated with operating the carbon dioxide removal assembly. As the skilled person understands, the pressure drop is affected by the configuration of the bed or sorbent material, for example by the size of the bed, the nature of the bed (e.g. whether it is a monolith or a bed of pellets or beads, the porosity of the monolith, and the particle size of the pellets or beads). The skilled person is familiar with techniques for adjusting the pressure loss. It may be particularly preferred that the bed of sorbent material is provided as a radial flow bed as this can provide a particularly low pressure drop.

As demonstrated below, for a typical passenger car carrying four passengers (including the driver), approximately 1 g of carbon dioxide removal is needed per minute in order to ensure that carbon dioxide levels remain at safe levels (e.g. below 1000 ppm). Accordingly, it is preferred that the carbon dioxide removal assembly is arranged to provide at least 1 g of carbon dioxide removal per minute. This may be achieved configuring the system to provide a suitable flow rate of air from the passenger cabin over the sorbent material (while the sorbent material is being employed to remove carbon dioxide from air from the passenger cabin). Suitable flow rates are typically in the range from 10 to 15 L/s. For example, the flow rate of air from the passenger cabin over the sorbent may be at least 5 L/s, at least 7 l/s, at least 8 L/s, at least 9 L/s or at least 10 L/s. At lower flow rates, insufficient carbon dioxide sorption is seen. The flow rate of air from the passenger cabin over the sorbent may be 25 L/s or less, 22 L/s or less, 20 L/s or less, 18 L/s or less, 17 L/s or less or 16 L/s or less. At higher flow rates, the energy required to flow the air over the sorbent material may increase the energy associated with operating the system to unacceptable levels.

As outlined below with reference to FIGS. 1 to 4, in a preferred embodiment the carbon dioxide removal assembly may include two or more beds of regenerable carbon dioxide sorbent material. Typically, one bed of sorbent material is used for carbon dioxide sorption (operated in sorption mode) while one is regenerated (subjected to regeneration). One or more actuators (e.g. valves or moveable flaps) may be provided to switch flow to each bed between the air from the passenger cabin (arriving via the carbon dioxide removal conduit) when the bed is operated in sorption mode, and desorption gas (arriving via the regeneration conduit) when the bed is subjected to regeneration. Similarly, one or more actuators (e.g. valves or moveable flaps) may be provided to switch flow from each bed between returning treated air to the passenger cabin (via the carbon dioxide removal conduit) when the bed is operated in sorption mode, and expelling desorbed carbon dioxide at a location exterior to the passenger cabin (via the regeneration conduit) when the bed is subjected to regeneration.

Where two or more beds of regenerable carbon dioxide sorbent material are provided, typically the system is configured to switch the beds between carbon dioxide sorption mode and regeneration at predetermined time intervals. For a sorbent material having a typical carbon dioxide capacity (e.g. as specified above), between 5 g and 30 g (e.g. between 10 g and 20 g) of sorbent material is typically required in each bed per minute of cycle time (where the cycle time is defined as the length of time a bed of sorbent material is operated in sorption mode before being regenerated). This quantity of sorbent material typically provides approximately 1 g of carbon dioxide sorption until it reaches its capacity, which is the amount of carbon dioxide sorption required per minute to keep carbon dioxide at safe levels in a typical car with four passengers.

For a typical car, the present inventors have found that a particularly suitable cycle time is approximately 10 minutes, meaning that a sorbent bed is operated in sorption mode for approximately 10 minutes, before being subjected to regeneration (again for approximately 10 minutes). This cycle time permits a convenient bed size: approximately 150-300 g per bed is required to keep carbon dioxide at safe levels in a typical car with four passengers for ten minutes. A bed of this size has an acceptable pressure drop, as demonstrated in the Examples section below. Regeneration of a bed of this size is possible within the 10 minute cycle time, with acceptable energy requirements, again as demonstrated in the Examples section below. Other bed sizes and associated cycle times are possible. However, a longer cycle time would result in the need for a larger bed which may increase the energy cost due to a larger pressure drop associated with increasing the bed size.

Typically, the cycle time will be at least 1 minute, at least 2 minutes, at least 5 minutes or at least 8 minutes. The cycle time may be 1 hour or less, 45 minutes or less, 30 minutes or less, 25 minutes or less, 20 minutes or less or 15 minutes or less.

Alternatively, switching between sorption mode and regeneration could be triggered where a carbon dioxide sensor detects rising carbon dioxide levels in the treated air or in the cabin, indicating that the sorbent bed has reached its carbon dioxide sorption capacity. This may be advantageous as it avoids energy expenditure on regenerating a bed which has not yet reached its capacity. Where a vehicle has fewer passengers, for example, it may take longer for a sorbent bed to reach capacity. As a further alternative, the system could be configured with multiple predetermined time intervals, selected e.g. according to the number of passengers in the passenger cabin.

It may not be necessary that the one sorbent bed is subjected to regeneration continuously for the whole time the other sorbent bed is operated in sorption mode. Regeneration may be halted once it is complete (e.g. once each part of the bed has reached a temperature in excess of its regeneration temperature for a predetermined period of time). This can result in energy savings by avoiding regenerating sorbent material which is not in need of regeneration.

When the regenerable carbon dioxide sorbent material is regenerated, typically desorption gas is flowed over the material. The nature of the desorption gas is not particularly limited. For example, it could be external air taken from outside the passenger cabin, or it could be waste air or other gases from elsewhere in the vehicle. Typically, the desorption gas is heated in order to heat the sorption material to a temperature above its regeneration temperature. The use of waste gases is particularly advantageous as it may allow waste heat from other processes in the vehicle to be used for regeneration of the regenerable carbon dioxide sorbent material, reducing the energy load.

The present inventors have found that a particularly suitable flow rate for the desorption gas is between 15 and 20 L/s. For example, the desorption gas flow rate may be at least 2 L/s, at least 5L/s, at least 8 L/s, at least 10 L/s or at least 15 L/s. The desorption gas flow rate may be 30 L/s or less, 25 L/s or less or 20 L/s or less.

A particularly suitable carbon dioxide removal assembly, e.g. for a car, may operate, or be configured to operate, according to the following system parameters:

Two beds of sorbent material are provided, each having between 150 g and 300 g of sorbent material, the sorbent material having a carbon dioxide sorption capacity of between 2 wt % and 8 wt %.

While it is operated in sorption mode, air from the passenger cabin is flowed over the sorption material at a flow rate between 10 L/s and 20 L/s.

The first bed is subjected to carbon dioxide sorption for a time between 5 and 15 minutes (e.g. between 8 and 12 minutes) before being regenerated for a time between 5 and 15 minutes (more preferably between 8 and 12 minutes). The second bed is regenerated while the first is subjected to carbon dioxide sorption, and vice versa.

During regeneration, the sorbent bed is heated to a temperature in excess of its regeneration temperature (e.g. in excess of 120° C., 110° C., 100° C. or 80° C.).

Preferably, the power required to regenerate the carbon dioxide sorbent material is less than 1 kW, more preferably less than 0.7 kW, less than 0.6 kW, less than 0.5 kW, less than 0.4 kW, or less than 0.3 kW. The power required may be at least 0.001 kW, or at least 0.05 kW.

System for Controlling the Atmosphere in the Passenger Cabin

The system, use and process according to the present invention are operable to maintain a carbon dioxide level below 1500 ppm in the passenger cabin for a period of at least 5 minutes, preferably at least 10 minutes, at least 20 minutes, at least 30 minutes or at least 60 minutes. The carbon dioxide level may be maintained below 1200 ppm, 1000 ppm 900 ppm, 800 ppm, 700 ppm, 600 ppm or 500 ppm. Typically, the carbon dioxide level in the passenger cabin will be at least 200 ppm, at least 300 ppm or at least 350 ppm.

It is unlikely to be possible to completely avoid the flow of air into the passenger cabin, e.g. by leakage or bleed through imperfect seals, or through some deliberate inflow of air. The system is operated or operable to restrict the flow of air from outside the vehicle into the passenger cabin to 10 L/s or less, preferably 8 L/s or less, 6 L/s or less or 5 L/s or less. In practice, the present inventors have found that a bleed rate of approximately 3 l/s is typical for local or city driving where speeds are typically 30 miles per hour or less. Bleed rates increasing with speed, with a bleed rate of 4 or 5 l/s more typical at speeds of 50 miles per hour and above.

The carbon dioxide sorbent materials employed in the present invention are regenerable. This means that ongoing sorption of carbon dioxide can be provided with prolonged use of the system. Preferably, the sorbent has a lifetime of at least 100 hours, at least 200 hours, at least 500 hours, at least 1000 hours or at least 2000 hours. Lifetime of the sorbent may refer to the cumulative time the sorbent is in use (in sorption mode and regeneration) until its carbon dioxide sorption capacity has reduced to 50% of its starting capacity.

The system, method and process of the present invention are for controlling the atmosphere in the passenger cabin of a vehicle. The nature of the vehicle is not particularly limited. For example, it may be powered by an internal combustion engine, and/or it may be powered by an alternative power train system such as an a battery-based system, a fuel cell-based system or a hybrid system. The vehicle may be a car, van, lorry et cetera. It may be a train, bus or aeroplane. Where the vehicle is a large volume vehicle, especially one intended to carry more than 5 or more than 8 passengers, the configuration of the system may need to be altered based on the principles described herein to provide adequate carbon dioxide adsorption. For example, the size of the bed and cycle time may need to be altered. The air leak rate will likely be higher than in a car. Alternatively, multiple carbon dioxide removal assemblies could be provided to operate in parallel. For example, one carbon dioxide removal assembly as described and/or defined herein may be provided per 3 $m^3$ to 6 $m^3$, e.g. per 4 $m^3$ or 5 $m^3$ of internal passenger cabin volume.

The internal volume of the passenger cabin may be less than 10 $m^3$, less than 8 $m^3$, less than 6 $m^3$, less than 5 $m^3$ or less than 4 $m^3$. It may be at least 1 $m^3$.

Typically, the vehicle is provided with a heating and/or cooling assembly for controlling the temperature in the passenger cabin. This may be a heating and/or cooling assembly which is separate from the carbon dioxide removal assembly. The heating and/or cooling assembly should be operable to take air from the passenger cabin, adjust its temperature and return the temperature adjusted air to the cabin (typically known as "recirculation mode"). HVAC systems which are operable in a recirculation mode are known to the skilled person.

Alternatively, the carbon dioxide removal conduit may pass air from the cabin through the heating and/or cooling assembly before or after it is flowed over the regenerable carbon dioxide sorbent material and before it is returned to the passenger cabin.

The heating and/or cooling system may also provide humidity control. HVAC systems which provide humidity control are known to the skilled person.

Contaminant Removal

As discussed above, a contaminant removal assembly may be provided. The contaminant removal assembly comprises one or more contaminant removal materials. A separate contaminant removal conduit arranged to flow air over and/or through the contaminant removal material to remove contaminants and supply the treated air to the interior of the passenger cabin may be provided. Preferably, the contaminant removal conduit removes air from the passenger cabin for treatment and returns it to the passenger cabin after it has been treated.

Alternatively, the carbon dioxide removal conduit may pass air from the cabin through the contaminant removal assembly before or after it is flowed over the regenerable carbon dioxide sorbent material and before it is returned to the passenger cabin.

Typically, the contaminant removal assembly will remove contaminants such as one or more selected from the group consisting of carbon monoxide, particulate contaminants, volatile organic compounds (VOCs), NOx and SOx. The VOCs may, for example, be selected from ammonia, benzene, acetaldehyde and formaldehyde. Separate contaminant removal materials may be provided for each contaminant, or a single contaminant removal material may be provided to remove a group of contaminants.

Each contaminant removal material may, for example, be selected from a filter for removing particulate contaminants, a sorbent (such as an adsorbent) for providing physical sorption of contaminants, or a catalytic material capable of catalytically decomposing contaminants. The contaminant removal material may be regenerable, e.g. by heating.

A suitable contaminant removal material for removing particulates is a fibrous mesh such as a cloth, paper or polymer mesh which traps solid particles from the air flow. The skilled person will be aware of numerous sources of suitable materials, such as Camfil Limited (www.camfil.co-.com)

Suitable contaminant removal materials for removing carbon monoxide include catalytic materials such as hop-calite (e.g. available from Carus Corporation (www.carus-corporation.com) and gol catalysts.

Suitable contaminant removal material for removing ammonia include acid materials such as acid treated activated carbon. The skilled person will be aware of numerous suppliers of acid treated activated carbon, such as Carbo-Chem Inc, USA.

Activated carbon is suitable for removing a range of VOCs, such as benzene and acetaldehyde. Contaminant removal using activated carbons is discussed in detail in Reference 5. Potassium permanganate may be used to remove formaldehyde, and suitable materials are available for example from Freudenberg Filter Technologies. Activated carbon can also be used for removing NOx and/or SOx.

The present inventors have found that NOx and/or SOx may poison the regenerable carbon dioxide sorbent material and/or the contaminant removal material(s), either permanently or reversibly. NOx and/or SOx guarding may be provided by suitable arrangement of the contaminant removal assembly with respect to the carbon dioxide removal assembly and the other contaminant removal materials, or by providing a separate NOx and/or SOx guard.

Description of Preferred Embodiments

FIG. 1 provides a schematic illustration of a system for controlling the atmosphere in the passenger cabin (1) of a vehicle according to a preferred embodiment of the present invention. A carbon dioxide removal conduit (2) provides a flow path for air from the cabin (1) to a guard chamber (3). The guard chamber (3) contains a material capable of trapping NOx and SOx. The carbon dioxide removal conduit (2) continues, providing a flow path for the air to pass to a contaminant removal chamber (4). The contaminant removal chamber (4) contains one or more contaminant removal materials. The carbon dioxide removal conduit then bifurcates to provides a flow path to two carbon dioxide removal chambers (5, 6). Each of the carbon dioxide removal chambers (5, 6) contains regenerable carbon dioxide sorption material.

A first valve (12) is provided at the point where the carbon dioxide removal conduit bifurcates to permit the air from the cabin (1) to flow to one of the two carbon dioxide removal chambers (5, 6). A regeneration conduit (7) is provided to flow desorption gas to the other of the two carbon dioxide removal chambers (5, 6). This flow is also controlled by the first valve (12). After passing through one of the carbon dioxide removal chambers (5, 6), the air from the cabin which has been treated to remove carbon dioxide is returned (9) to the cabin (1) via the carbon dioxide removal conduit (2). After passing through the other of the two carbon dioxide removal chambers (5, 6), the desorption gas is expelled (8) at a location exterior to the cabin (1) via regeneration conduit (7). Flow of gas for return (9) to the cabin (1) or for expulsion (8) is controlled by a second valve (13). Typically, a heater (not shown) is provided to heat the desorption gas to a temperature suitable for desorbing carbon dioxide from the regenerable carbon dioxide sorption material.

The first valve (12) and the second valve (13) are operable to switch the flow in the carbon dioxide removal conduit (2) and the regeneration conduit (7) to change which of the two carbon dioxide removal chambers (5, 6) is removing carbon dioxide and which is being regenerated. In use, this switching happens periodically, e.g. every ten minutes.

A heating and/or cooling assembly (10) is also provided. Air is removed from the cabin (1) and treated in the heating and/or cooling assembly (10) to achieve a desired temperature before it is returned to the cabin (1).

Typically, fans (not shown) are provided to drive air flow in the system.

Figure 2:
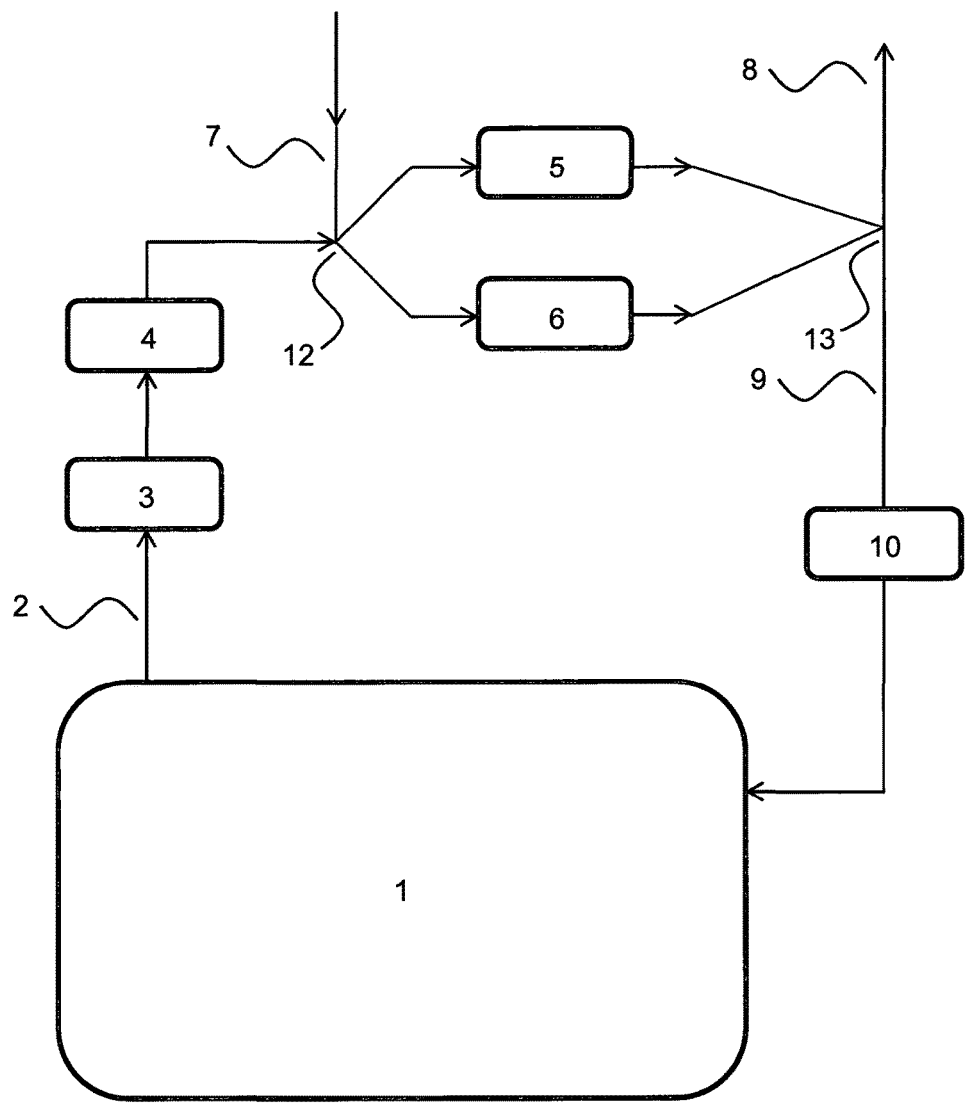
FIG. 2 illustrates a system for controlling the atmosphere in the passenger cabin of a vehicle which is a variation of the embodiment illustrated in FIG. 1.

FIG. 2 illustrates a variation of the embodiment illustrated in FIG. 1. Here, the carbon dioxide removal conduit (2) is arranged to flow air to the heating and/or cooling assembly (10) before the air is returned to the cabin (1).

Figure 3:
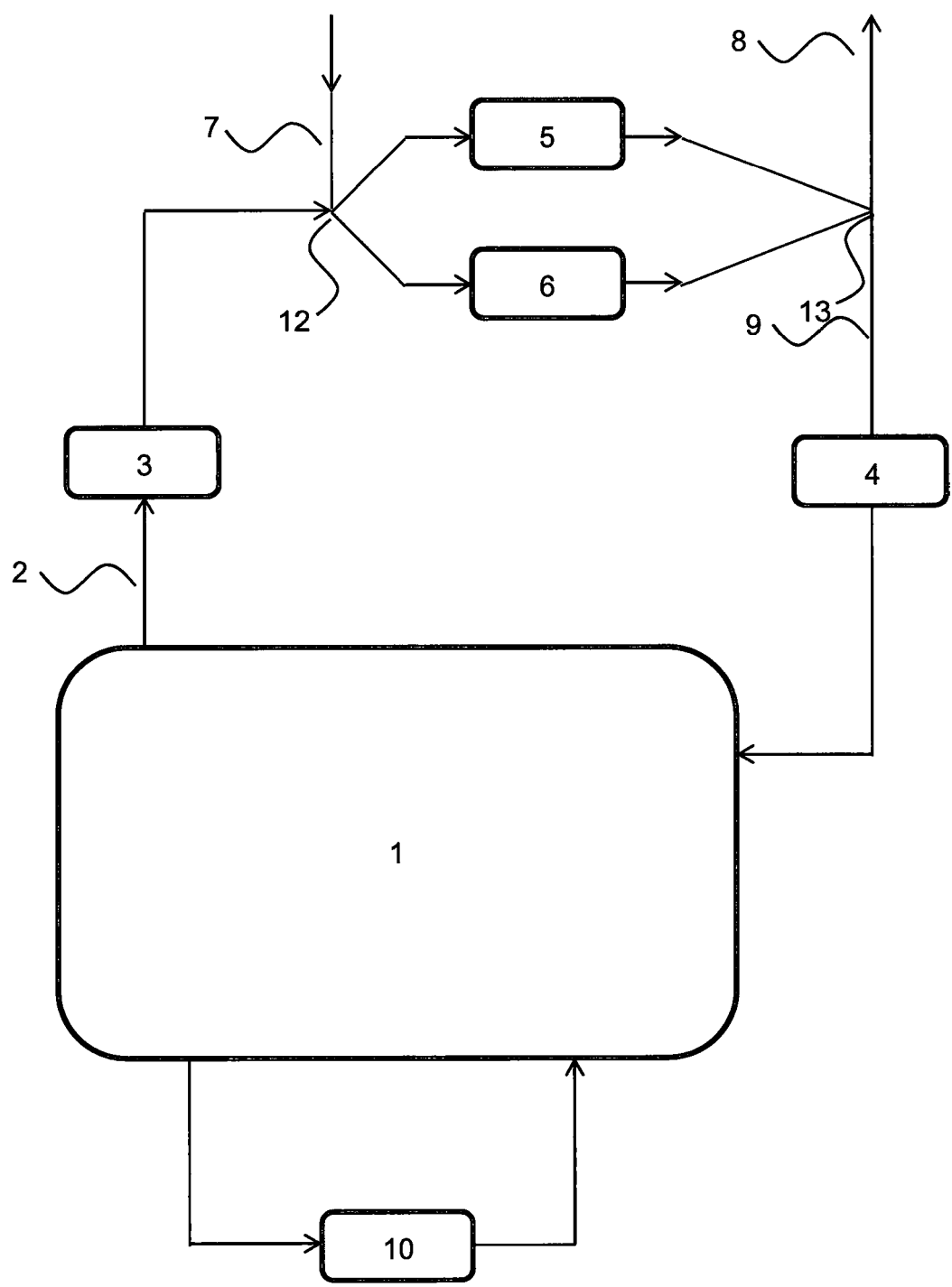
FIG. 3 illustrates a system for controlling the atmosphere in the passenger cabin of a vehicle which is a variation of the embodiment illustrated in FIG. 1.

FIG. 3 illustrates a variation of the embodiment illustrated in FIG. 1. Here, the contaminant removal chamber (4) is located after the carbon dioxide removal chambers (5, 6) in the flow path provided by the carbon dioxide removal conduit (2). This variation may also be applied to the embodiment illustrated in FIG. 2. In that case, the contaminant removal chamber (4) may be positioned before or after the heating and/or cooling assembly (10) in the flow path provided by the carbon dioxide removal conduit (2).

Figure 4:
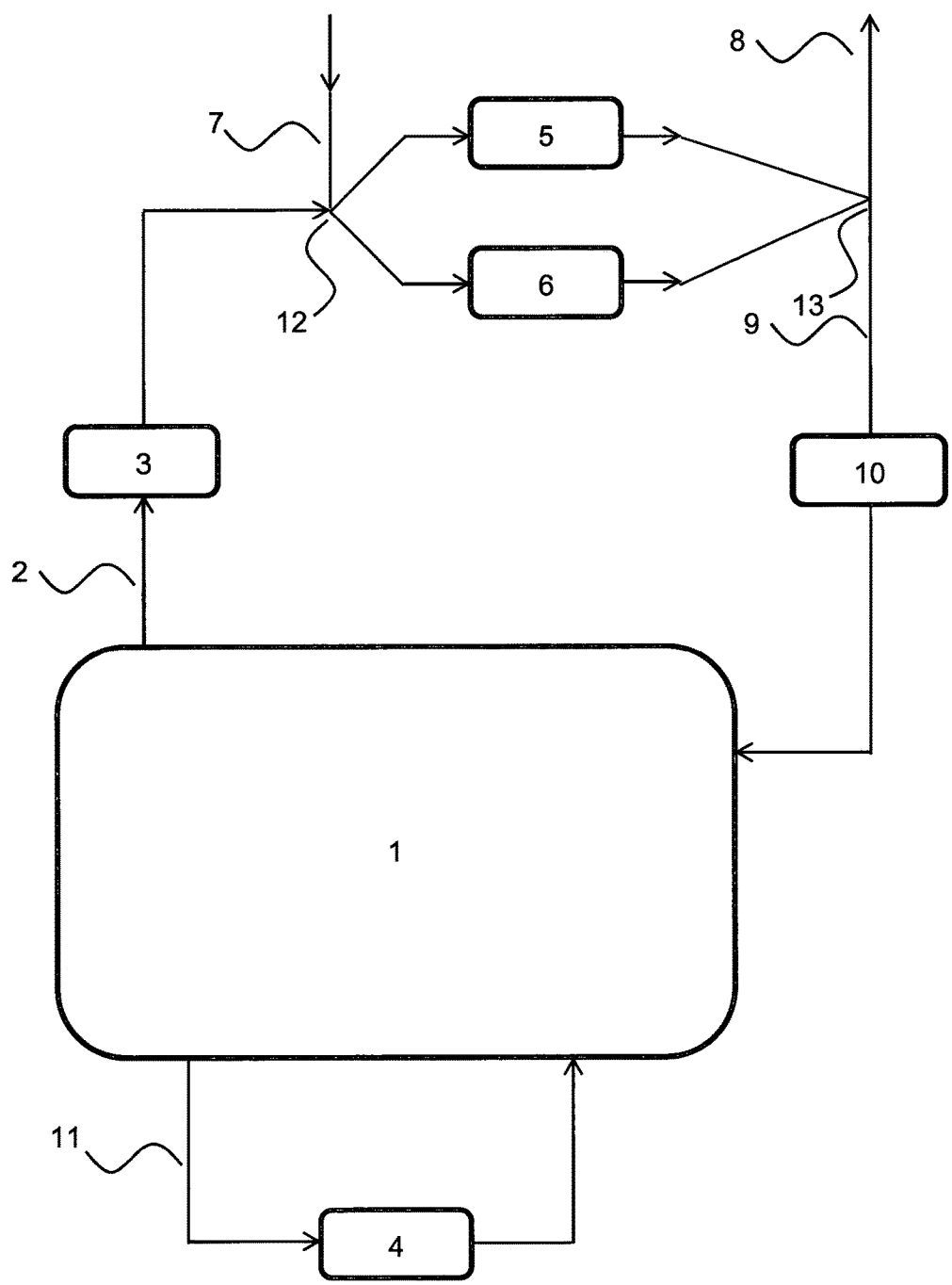
FIG. 4 illustrates a system for controlling the atmosphere in the passenger cabin of a vehicle which is a variation of the embodiment illustrated in FIG. 2.

FIG. 4 illustrates a further variation of the embodiment illustrated in FIG. 2. Here, the contaminant removal chamber (4) is connected to the cabin (1) by a contaminant removal conduit (11) which is arranged to flow air from the cabin (1), through the contaminant removal chamber (4) and return the treated air to the cabin (1). This variation may also be applied to the embodiment illustrated in FIG. 1.

Experimental and Modelling Data
Carbon Dioxide Build-up

In order to better understand the carbon dioxide build up in the passenger cabin of a vehicle under real conditions, data was collected and compared to a mass balance model designed to predict the carbon dioxide levels under a range of conditions.

Mass Balance Model

Adult human lung capacity is typically between 4 and 7 L, but an adult human typically takes in 0.4 L of air per breath. At a heart rate between 50 and 70 beats per minute, an adult human typically takes between 12 and 15 breaths per minute. The air exhaled by an adult human typically comprises 74.8% $N_2$, 15.3% $O_2$, 3.7% $CO_2$, and 6.2% water vapour. The density of $CO_2$ is 1.98 g/L, so the mass of $CO_2$ exhaled per breath is 0.03 g which equates to about 0.4 to 0.5 g per minute per person.

The mass balance of a cabin air needs to satisfy this scenario:

Input=Output+Accumulation $CO_2$ build up=Flow bleed ($CO_2$ in the air–$CO_2$(t))+$CO_2$ generated:

The equation is:

$V\, dC/dt = Q(Co-C(t))+G$

Figure 5:
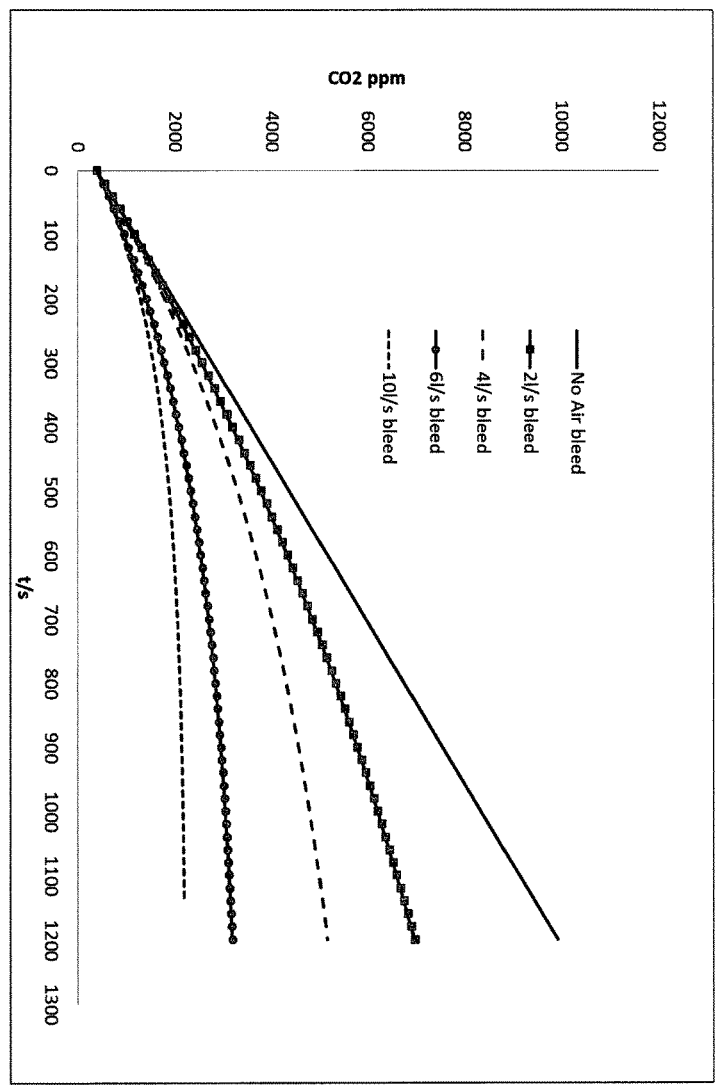
FIG. 5 shows the modelled carbon dioxide build up in the passenger cabin of a car.

Where:

Q=Air bleed C=$CO_2$ concentration at any time Co=Air $CO_2$ concentration ~400 ppm G=carbon dioxide concentration generated by breathing and V=Cabin air total volume ~3 $m^3$ Equation Solution: $C(t)=Co+G/Q(1-e^{(-Qt/V)})$ FIG. 5 shows the modelled carbon dioxide build up in the passenger cabin of a car having an approximate total volume of 3 $m^3$, with 4 people breathing producing carbon dioxide at a rate of 0.5 g carbon dioxide per minute per person, where the air has a baseline carbon dioxide concentration of 400 ppm according to the model above, at different bleed rates.

The model clearly shows the carbon dioxide will increase linearly if there is no air leak (i.e. in a completed sealed passenger cabin). However, this is unrealistic as passenger cabins are typically not completely sealed: there will be some air leakage e.g. around doors or windows with imperfect seals. The calculations for different air bleed rates show that as expected, increasing the external air bleed reduces the carbon dioxide level inside the cabin. However, even with a bleed rate of 10 l/s, carbon dioxide levels approaching 2000 ppm are expected (twice the preferred safe limit of 1000 ppm). In practice, the present inventors have found that a bleed rate of approximately 3 l/s is typical for local or city driving where speeds are typically 30 miles per hour or less. Bleed rates increasing with speed, with a bleed rate of 4 or 5 l/s more typical at speeds of 50 miles per hour and above. At these bleed rates, carbon dioxide build up to unsafe levels occurs quickly when air is fully recirculated in the cabin.

Real Life Data

Figure 6:
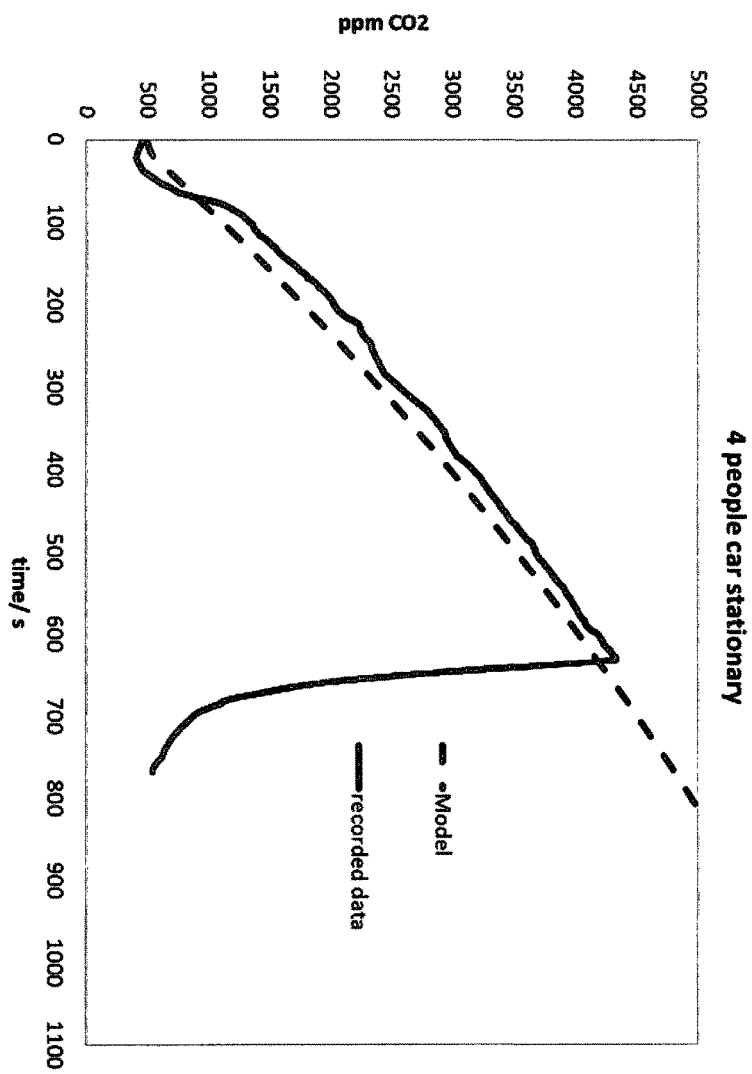
FIGS. 6 and 7 compare the carbon dioxide levels predicted by the model with real-life data.
Figure 7:
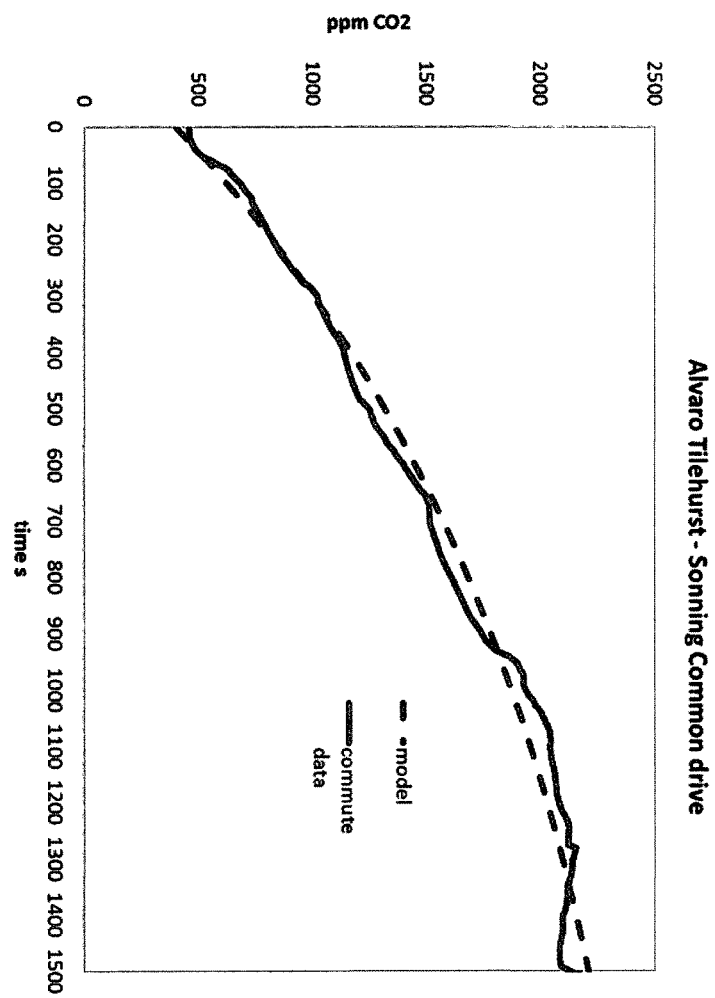

FIGS. 6 and 7 compare the carbon dioxide levels predicted by the model with real life data. FIG. 6 compares the model with data collected for four people in a stationary car with a cabin volume of 3 $m^3$, with a 2 l/s bleed rate, showing that the actual data closely matches the predictions. FIG. 7 shows data taken on a journey with a single passenger, with a carbon dioxide air baseline of 390 ppm and an air bleed rate of 3 l/s, and compares it with the model under the same conditions. These figures show that the model closely matches real life data.

Carbon Dioxide Removal

A model was developed to calculate the minimum flow over a regenerable carbon dioxide sorbent material needed during air recirculation to maintain carbon dioxide levels below about 1000 ppm. The model consists of a mass balance taking into consideration air leak (bleed), air flow through the carbon dioxide removal assembly and $CO_2$ levels built up by passengers breathing.

Mass Balance:

Input=Output+Accumulation $CO_2$ build up=Flow bleed ($CO_2$ air–$CO_2$(t))+$CO_2$ generated–$CO_2$ adsorbed:

$$V\frac{dC}{dt} = Q1(Co - C(t)) + G - Q2 C(t)$$

V=cabin air volume ~3 $m^3$, Q1=Bleed air 2-6 l/s G~$CO_2$ generation 0.005 l/s per person Q2=Blower into $CO_2$ sorbent material assuming 100% conversion at all times and Co=350 ppm $CO_2$ in air.

Solution:

$$C(t) = \frac{A}{B} - \left\{\frac{(A - BCo)}{B}\right\}(1 - e(-Bt))$$

Where:

$$A = \left(Q1Co + \frac{G}{V}\right) \text{ and } B = \left(\frac{Q1 + Q2}{V}\right)$$

Carbon Dioxide Sorption

Figure 8:
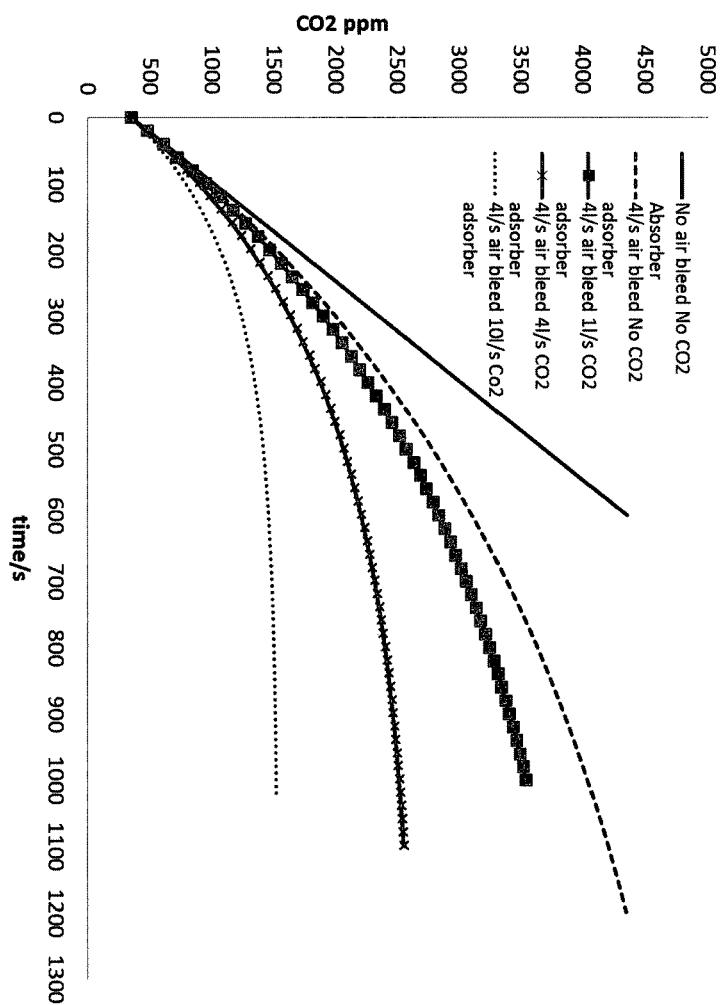
FIG. 8 shows modelled carbon dioxide build up under different conditions and in the presence and absence of a carbon dioxide removal assembly according to an embodiment of the present invention.

Data generated using this model for different flow rates over the carbon dioxide sorbent material is presented in FIG. 8. This figure shows that assuming a 4 l/s passenger cabin air bleed, with four passengers, approximately 10 to 15 L/s flow of air from the passenger cabin over the carbon dioxide sorbent material is needed in order to retain carbon dioxide levels at safe levels (below 1000 ppm) at all times.

The same model was used to predict the $CO_2$ mass dependence with time and therefore the amount of material needed to keep the $CO_2$ levels in the cabin below 1000 ppm for different periods of time (depending on the $CO_2$ scavenger's capacity in wt % $CO_2$).

Typically, the capacity of a suitable regenerable carbon dioxide sorbent material is in the range from 3 to 6 wt % (i.e. for every 100 g of sorbent material, between 3 and 6 g of carbon dioxide will be adsorbed before the material becomes saturated). Therefore, between 150 and 300 g of sorbent material is needed to provide 1 g of carbon dioxide sorption per minute for ten minutes (depending on the capacity of the sorption material).

We have considered provision of the regenerable carbon dioxide sorbent material both as pellets and coated onto a monolith or extrudate.

For monolith coating, approximately 3 g of material is coated per cubic inch, resulting in a monolith volume between approximately 1 and 2 litres (depending on the capacity of the sorbent material). The GHSV (Gas Hourly Space Velocity) calculated for a 1 litre monolith and a 2 litre monolith, based on the above volumes and a flow of 15 L/s are 30000 and 60000 $h^{-1}$ respectively.

If pellets are used instead a minimum volume of 1 L is typically required to keep GHSV values around 50000 $h^{-1}$.

Regeneration of the Sorbent Material

The energy required to regenerate the carbon dioxide sorbent material once saturated was calculated. The calculations are based on a two bed system (e.g. as described above with reference to FIG. 1), where one bed of regenerable carbon dioxide material adsorbs carbon dioxide from cabin air while another is regenerated.

The calculations were based on a ten minute cycle, where 10 g of carbon dioxide is removed from passenger cabin air by one bed of sorbent material over a 10 minute period, before that bed is regenerated and the other bed switched to sorption mode. This means that the bed needs to be heated to its regeneration temperature and returned to its sorption temperature within 10 minutes.

As discussed above, the present inventors have found that immobilised amines are particularly suitable regenerable sorption materials for carbon dioxide removal from passenger cabin air in a vehicle. For example, for immobilised amines a suitable regeneration temperature may be 100° C. and a suitable sorption temperature may 20° C., meaning that such a bed of immobilised amine sorption material needs to be heated to 100° C. and cooled back down to 20° C. within 10 minutes, when the system operates on a 10 minute cycle as set out above. It is also important that the whole bed of sorbent material reaches the regeneration temperature and is cooled to the sorption temperature within the 10 minute regeneration cycle, so that carbon dioxide is fully desorbed during regeneration, and to ensure that the material is ready to commence sorption when its sorption duty commences.

Figure 9:
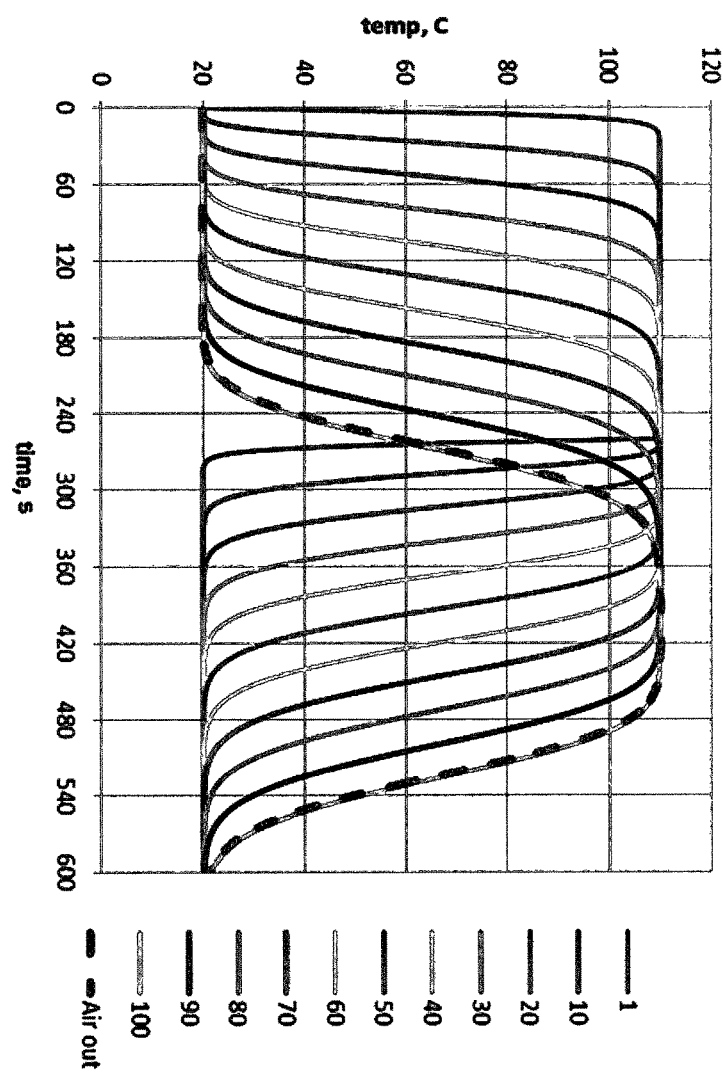
FIG. 9 illustrate a typical modelled heating and cooling profile for 3-amino propyl silica carbon dioxide sorbent material coated onto a two litre monolith.

The heater power required is calculated by elemental heat balance and calculations based on the materials' heat transfer coefficients. Here, the calculations are based on (i) 3-amino propyl silica carbon dioxide sorbent material and (ii) polystyrene benzyl amine carbon dioxide sorbent material. Calculations were performed for a coated monolith, pellets of sorbent material and beads of sorbent material. The monolith is cordierite for the monolith calculations. Each part of the bed is modelled to be held at a temperature in excess of the regeneration temperature for at least three minutes, and then cooled to 20° C. within the 10 or 30 minute regeneration cycle. From this, the air flow required and the time to hold the air at a temperature above the regeneration temperature was determined. FIG. 9 illustrates a typical modelled heating and cooling profile for 3-amino propyl silica carbon dioxide sorbent material, coated onto a 2 litre monolith.

The regeneration temperature for 3-amino propyl silica carbon dioxide sorbent material is approximately 100° C. The regeneration temperature for polystyrene benzyl amine carbon dioxide sorbent material is approximately 70° C.

(These calculations assume heaters are 100% efficient and that there is no heat loss from the sorbent beds).

The pressure drop was calculated for monoliths or pellet beds using standard pressure drop correlations. Pressure drops from lines, valves and fittings were assumed to be relatively low compared with the pressure drops associated with the sorbent bed based on a 40 mm line size. The required fan power was calculated from the total pressure drop and the required flow, assuming a fan efficiency of 30%.

The average power required for the regeneration system over a 10 or 30 minute regeneration cycle is shown in the tables below. Calculations have been performed using 3-amino propyl silica and polystyrene benzylamine as absorbent material, with 3% weight and 6% weight $CO_2$ capacities respectively. The temperature for desorption used for the materials in the calculations is also different, 100° C. for 3-amino propyl silica and 70° C. for polystyrene benzylamine. Table 1 shows the average power required by the heater, Table 2 shows the average power required by the fan to maintain the required flow rate, and Table 3 shows the total power required for the system to run.

TABLE 1

|  | 3-amino propyl silica | | Polystyrene benzylamine Resin beads |
|---|---|---|---|
|  | Monolith | Pellets (3 × 3 mm) | (0.5 mm diameter) |
| Regeneration cycle length/min | 10 | 10 | 10 | 30 |
| Time held at regeneration temperature/min | 3 | 3 | 3 | 10 |
| Air flow over sorbent material/l/s | 2.7 | 2.1 | 1.4 | 4.2 |
| Air heater temperature | 110 | 110 | 80 | 80 |
| Time to start cooling/s | 260 | 300 | 270 | 270 |
| Heater duty/W | 284 | 220 | 98 | 281 |
| Average power requirement/W | 123 | 110 | 44 | 44 |

The power requirement is based on an averaging of the heat requirements over a full 10 or 30 minute cycle. The power requirement is not constant as the heater is only on for part of the cycle.

TABLE 2

|  | 3-amino propyl silica | | Polystyrene benzylamine |
|---|---|---|---|
|  | Monolith | Pellets (3 × 3 mm) | Resin beads (0.5 mm diameter) |
| Regeneration cycle length/min | 10 | 10 | 10 | 30 |
| System pressure drop/mbar | 22 | 13 | 40 | 133 |
| Fan flow/l/s | 18 | 17 | 16 | 19 |
| Fan efficiency/% | 30 | 30 | 30 | 30 |
| Fan power requirement/W | 140 | 80 | 209 | 824 |

TABLE 3

| | 3-amino propyl silica | | | Polystyrene benzylamine |
|---|---|---|---|---|
| | Monolith | Pellets (3 × 3 mm) | Resin beads (0.5 mm diameter) | |
| Regeneration cycle length/min | 10 | 10 | 10 | 30 |
| Average heater power requirement/kW | 0.12 | 0.11 | 0.044 | 0.044 |
| Fan power requirement/kW | 0.14 | 0.08 | 0.21 | 0.82 |
| Total/kW | 0.26 | 0.19 | 0.25 | 0.86 |

Note that in the case of an internal combustion engine, the power requirement of the heater could be wholly or partially met by waste heat from the engine, reducing the energy cost of operating the regenerable carbon dioxide sorbent assembly. For vehicles which do not have a source of waste heat, such as electric vehicles, the power requirement of the heater would have to be met by the powertrain of the vehicle.

Energy consumption of the heater for polystyrene benzylamine is significantly lower due to the lower desorption temperature. The small bead size (300-650 μm) of polystyrene benzylamine compared to a monolith or 3×3 mm beads means there is a significant increase in the energy needed to overcome back pressure of sorbent bed. The total energy per cycle for polystyrene benzylamine is slightly lower than the 3-amino propyl silica monolith. The 3-amino propyl silica pellets have the lowest energy requirement per cycle.

The power requirement for the polystyrene benzylamine resin beads on a 30 minute regeneration cycle results from the considerably increased pressure drop associated with the need for a significantly larger bed in order to provide carbon dioxide adsorption at a rate of 1 g per minute for 30 minutes. The calculations have all assumed a typical cylindrical bed. A radial flow device could dramatically reduce the pressure drop and accordingly significantly reduce the contribution of pressure drop to the overall energy requirements of the system.

Significantly, the energy cost of the regeneration cycles modelled above is considerably less than the energy benefit associated with running a vehicle in recirculation mode, especially when the external conditions are particularly hot and/or humid. Accordingly, the present inventors consider that the present invention provides the potential for significant energy benefits.

REFERENCES

1. Farrington and J. Rugh, "Impact of Vehicle Air-Conditioning on Fuel Economy, Tailpipe Emissions, and Electric Vehicle Range" Presented at the Earth Technologies Forum Washington, D.C. Oct. 31, 2000 http://www.nrel.gov/docs/fy00osti/28960.pdf (NREL/CP-540-28960)

2. Recirculating Air Filtration Significantly Reduces Exposure to Airborne Nanoparticles David Y. H. Pui, Chaolong Qi, Nick Stanley, Gunter Oberd Orster, and Andrew Maynard, Environmental Health Perspectives, Vol. 116, No 7, July 2008, pages 863-866

3. Modelling CO2 Concentrations in Vehicle Cabin, Heejung Jung, Univ. of California Riverside, SAE International, DOI 10.4271/2013-01-1497.

4. Vehicle Cabin Air Quality with Fractional Air Recirculation, Heejung Jung, Univ. of California Riverside, SAE International, DOI 10.4271/2013-01-1494.

5. Impregnated Activated Carbon for Environmental Protection, K.-D. Henning and S. Schafer, Gas Separation and Purification, 1993 Vol 7 No 4 P235.

The invention claimed is:

1. A system for controlling the atmosphere in a passenger cabin of a vehicle, the system comprising;
a carbon dioxide removal assembly, comprising
a bed of regenerable carbon dioxide sorbent material, wherein the bed comprises a monolith having the sorbent material coated thereon, or the sorbent material in the form of pellets or beads;
a carbon dioxide removal conduit arranged to flow air from the interior of the passenger cabin over the regenerable carbon dioxide sorbent material and return the treated air to the passenger cabin; and
a regeneration conduit arranged to flow desorption gas over the regenerable carbon dioxide sorbent material to desorb carbon dioxide from the sorbent material and expel the desorbed carbon dioxide at a location exterior to the cabin;
whereby the system is operable to maintain a carbon dioxide level below 1500 ppm in the passenger cabin for a period of at least 5 minutes while restricting the flow of air from outside the vehicle into the passenger cabin to 10 L/s or less, and
wherein the sorbent material comprises benzylamine functional groups immobilized on a polystyrene solid support; and
wherein the system is configured to adsorb carbon dioxide onto the sorbent at a temperature of from −10° C. to 50° C., and configured to heat the sorbent to a temperature of from 50° C. to 80° C. to desorb carbon dioxide.

2. A system according to claim 1, further comprising a contaminant removal assembly.

3. A system according to claim 2 wherein the contaminant removal assembly comprises one or more contaminant removal materials and is operable to flow air over and/or through the contaminant removal material(s) to remove contaminants and supply the treated air to the interior of the passenger cabin.

4. A system according to claim 1 wherein the carbon dioxide sorbent material has a carbon dioxide capacity in the range from 1 to 10 wt %.

5. A system according to claim 1 which comprises two or more beds of carbon dioxide sorbent material and wherein the system is configured to switch the beds between a carbon dioxide sorption mode and a regeneration mode at predetermined time intervals.

6. A system according to claim 1, wherein the system is configured to operate in a sorption mode and a regeneration mode and the cycle time is in the range from 5 minutes to 25 minutes, where the cycle time is defined as the length of time the bed of sorbent material is operated in the sorption mode before being regenerated.

7. A system according to claim 6 wherein between 5 g and 30 g of sorption material is provided per minute of cycle time.

8. A system according to claim 1 wherein the energy required to regenerate the bed of sorbent material is less than 1 kW.

9. A system according to claim 1 wherein the flow of air from the passenger cabin over the sorbent material is in the range from 8 L/s to 20 L/s.

10. A system according to claim 1 wherein the system is configured to provide at least 1 g of carbon dioxide removal per minute.

11. A process for controlling the atmosphere in a passenger cabin of a vehicle, the process comprising:
(i) at a temperature of from −10° C. to 50° C., flowing a portion of the air from within the passenger cabin over a bed of regenerable carbon dioxide sorbent material to remove carbon dioxide by adsorbing the carbon dioxide onto the sorbent material, and returning the treated air to the passenger cabin,
wherein the bed of regenerable carbon dioxide sorbent material comprises a monolith having the sorbent material coated thereon, or the sorbent material in the form of pellets or beads; and
(ii) regenerating the regenerable carbon dioxide sorbent material by heating the sorbent material to a temperature of from 50° C. to 80° C. to desorb carbon dioxide, flowing desorption gas over the regenerable carbon dioxide sorbent material to desorb carbon dioxide from the sorbent material, and expelling the desorbed carbon dioxide at a location exterior to the passenger cabin,
wherein steps (i) and (ii) are repeated to maintain the carbon dioxide level below 1500 ppm in the passenger cabin for a period of at least 5 minutes while restricting the flow of air from outside the vehicle into the passenger cabin to 10 L/s or less, and
wherein the sorbent material comprises benzylamine functional groups immobilized on a polystyrene solid support.

12. A vehicle comprising a passenger cabin and a system for controlling the atmosphere in the passenger cabin, wherein the system is as defined in claim 1.

13. A system according to claim 1 wherein the benzylamine functional group is a primary benzylamine functional group.

14. A process according to claim 11 wherein the sorbent material comprises a moiety comprising a primary benzylamine functional group.

15. A process according to claim 14 wherein the sorbent material is regenerated at a temperature of less than 80° C.

* * * * *